United States Patent
Kubo et al.

(10) Patent No.: US 8,382,079 B2
(45) Date of Patent: Feb. 26, 2013

(54) LIQUID SEALED VIBRATION ISOLATING DEVICE

(75) Inventors: Nobuo Kubo, Wako (JP); Hiroshi Yanagase, Wako (JP); Jun Saito, Fujimino (JP)

(73) Assignees: Honda Motor Co., Ltd., Tokyo (JP); Yamashita Rubber Kabushiki Kaisha, Fujimino-Shi (JP)

( * ) Notice: Subject to any disclaimer, the term of this patent is extended or adjusted under 35 U.S.C. 154(b) by 903 days.

(21) Appl. No.: 12/050,379

(22) Filed: Mar. 18, 2008

(65) Prior Publication Data

US 2008/0230968 A1 Sep. 25, 2008

(30) Foreign Application Priority Data

Mar. 22, 2007 (JP) ................................. 2007-075658

(51) Int. Cl.
  *F16F 5/00* (2006.01)
(52) U.S. Cl. .................................. 267/140.13; 267/292
(58) Field of Classification Search ............. 267/140.11, 267/140.4, 141.6, 140.12, 140.13, 140.14, 267/140.15, 140.2, 140.3, 140.5, 141, 141.1, 267/141.2, 141.3, 141.4, 141.5, 141.7
See application file for complete search history.

(56) References Cited

U.S. PATENT DOCUMENTS

| 5,967,500 | A | * | 10/1999 | Satori et al. .............. 267/140.13 |
| 6,267,362 | B1 | * | 7/2001 | Satori et al. .............. 267/140.13 |
| 6,311,963 | B1 | | 11/2001 | Suzuki et al. |
| 6,349,927 | B1 | * | 2/2002 | Suzuki .................... 267/140.13 |
| 6,799,753 | B2 | * | 10/2004 | Okanaka et al. .......... 267/140.13 |
| 2002/0000688 | A1 | * | 1/2002 | Simuttis et al. .......... 267/140.13 |
| 2002/0145240 | A1 | * | 10/2002 | Satori et al. .............. 267/140.13 |
| 2002/0158389 | A1 | * | 10/2002 | Yoshida et al. .......... 267/140.11 |

(Continued)

FOREIGN PATENT DOCUMENTS

| DE | 3701264 C2 | 7/1988 |
| DE | 10218765 A1 | 5/2003 |

(Continued)

OTHER PUBLICATIONS

English-language machine translation of JP 2007-085515 obtained from www.ipdl.inpit.go.jp.*

(Continued)

*Primary Examiner* — Bradley King
*Assistant Examiner* — Nicholas J Lane
(74) *Attorney, Agent, or Firm* — Rankin, Hill & Clark LLP (57) ABSTRACT

A vibration isolating device includes an insulator for isolating the transmission of an inputted vibration by an elastic deformation. A principal vibration input portion is provided in a central area of a concave curved wall portion formed in the insulator. A thin wall portion and a thick wall portion are formed by relatively varying a thickness of the insulator around the vibration input portion, wherein the concave curved wall portion of the insulator is formed in a substantially circular shape when viewed in a principal vibration inputted direction. The thick wall portion is formed substantially in the shape of a belt of a predetermined width and extends across the concave curved wall portion in the diametrical direction thereof while passing the vibration input portion. A rigid body covering portion for covering a surface of a metallic member of the vibration input portion is provided in the central area of the thick wall portion. A thickness of the rigid body covering portion is at least 1.7 mm.

6 Claims, 7 Drawing Sheets

U.S. PATENT DOCUMENTS

| | | | |
|---|---|---|---|
| 2006/0043658 A1* | 3/2006 | Tanaka et al. | 267/140.13 |
| 2006/0091281 A1 | 5/2006 | Miyahara | |
| 2006/0091594 A1* | 5/2006 | Miyahara | 267/140.13 |
| 2006/0097436 A1 | 5/2006 | Yamamoto | |
| 2008/0237952 A1* | 10/2008 | Nishi | 267/140.13 |
| 2009/0283945 A1* | 11/2009 | Kojima et al. | 267/140.13 |
| 2010/0096787 A1* | 4/2010 | Kojima | 267/140.13 |
| 2010/0102495 A1* | 4/2010 | Okumura et al. | 267/140.13 |
| 2010/0264569 A1* | 10/2010 | Kojima | 267/140.11 |

FOREIGN PATENT DOCUMENTS

| | | |
|---|---|---|
| DE | 69827247 T2 | 12/2005 |
| JP | 09014333 | 1/1997 |
| JP | 2000-186739 | 7/2000 |
| JP | 2004150546 A * | 5/2004 |
| JP | 2007032745 A * | 2/2007 |
| JP | 2007085515 A * | 4/2007 |

OTHER PUBLICATIONS

Machine Translation of JP 2004-150546 A.*
Machine Translation of JP 2007-032745 A.*

* cited by examiner

LIQUID SEALED VIBRATION ISOLATING DEVICE

BACKGROUND OF THE INVENTION

1. Field of the Invention

The present invention relates to a vibration isolating device for use in an engine mount or the like for motor vehicles and particularly, to the device of which durability is improved in the case of employing an insulator provided with a thin wall portion.

2. Description of the Related Art

As a vibration isolating device for use in an engine mount or the like for the motor vehicles, there is known a liquid sealed vibration isolating device provided with a generally dome-shaped insulator which forms a portion of a liquid chamber, wherein a principal vibration is inputted from a vibration inputting section provided around a center portion of the insulator. Also, there is proposed that the thickness of the insulator is relatively varied to provide a thick wall portion and a thin wall portion, and the whole of the insulator is formed to be low spring constant by the thin wall portion so as to control an increase in liquid pressure when the vibration is excessively inputted (for example, see a patent reference 1). Patent reference 1: Japanese patent laid open publication No. 2000-186739.

Figure 7:
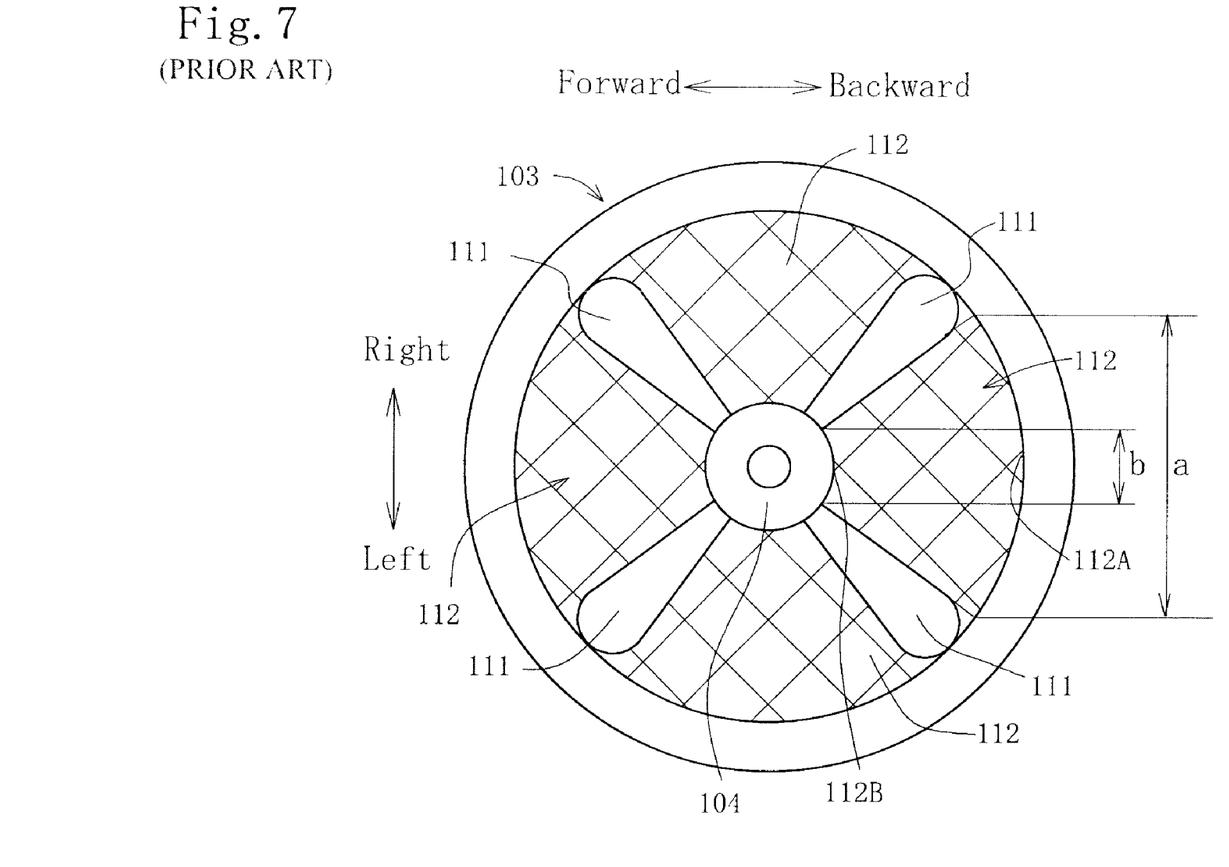
FIG. 7 is a view of a conventional insulator shown in a principal vibration inputted direction.

FIG. 7 is a schematic illustration showing an insulator 103 having such thin wall portion, in the input direction of the principal vibration. The thin wall portions 111 are formed in a cross shape, and between the neighboring thin wall portions 111 there is provided a relatively thick generally fan-shaped thick wall portion 112 (shown in cross striped hatching). At the central area there is provided a vibration input portion 104 to which the principal vibration is inputted.

By the way, the thick wall portions 112 are formed in a fan-shape by the provision of the thin wall portions 111, and the width "a" of an outer peripheral restrained portion 112A is remarkably greater than the width "b" of a central restrained portion 112B. Therefore, when the elastic deformation mainly comprised of tension and compression deformation is caused between the vicinity of the outer peripheral restrained portion 112A and the vicinity of the central restrained portion 112B of the thick wall portion 112 by the input of the vibration in the direction (hereinafter, referred to as "horizontal direction") meeting at right angles with the input direction (hereinafter, referred to as "vertical direction") of the principal vibration, there is a marked difference in rigidity between the vicinity of the outer peripheral restrained portion 112A and the vicinity of the central restrained portion 112B. As a result, the stress concentration is developed on the side of the central restrained portion 112B of less rigidity so that the durability may be decreased.

While there are cases where a rigid body covering portion for integrally covering the vibration input portion is provided in the central position of the thick wall portion, the thickness of this rigid body covering portion is about 1.5 mm at the thickest possible manufacturing limit. Then, since the movement is controlled by the vibration input portion of rigid body, the thick wall portion is divided by the central vibration input portion so that the free length (see "f" in FIG. 3) of elastic deformation becomes comparatively short. Accordingly, the stress concentration in the vicinity of the central restrained portion 112B is increased, whereby there has caused a disadvantage such as a crack or the like in this area by a comparatively small number of repeated vibrations. Hitherto, there has not been known that this thickness has an influence upon the durability improvement.

Further, in the case where the spring constant in the vertical direction is Z, and the spring constant in the dual directions meeting at right angles on the same horizontal plane is X and Y, when the spring constant in the horizontal direction is greater than the one in the vertical direction, the above mentioned stress concentration is developed remarkably so that in view of the durability it is not possible to increase the spring constant in the horizontal direction large enough to be expected. Accordingly the spring constant ratio of Z:X:Y in each of the directions is about 1:0.8:0.4 at the most. In recent years, however, it has been required that the insulator has the largely improved spring constant ratio such that each spring constant ratio of X and Y to Z is 1.0 or greater. Therefore, it is a principal object of the present invention to make it possible to improve the durability of the insulator even if the thin wall portion is provided. Also, it is another object to improve the spring constant ratio in such a manner as to make the spring constant in the horizontal direction greater.

SUMMARY OF THE INVENTION

To achieve the above mentioned objects, a vibration isolating device according to a first aspect of the present invention comprises an insulator for isolating the transmission of an inputted vibration by an elastic deformation, a principal vibration input portion being provided in a central area of a concave curved wall portion formed in the insulator, a thin wall portion and a thick wall portion being formed by relatively varying a thickness of the insulator around the vibration input portion. The concave curved wall portion of the insulator is formed in a substantially circular shape when viewed in the input direction of the principal vibration. The thick wall portion is formed substantially in the shape of a belt of a predetermined width and extends across the concave curved wall portion in the diametrical direction thereof while passing the vibration input portion. A rigid body covering portion for covering a surface of a metallic member of the vibration input portion is provided in the central area of the thick wall portion. A thickness of the rigid body covering portion is 1.7 mm or greater.

According to a second aspect of the present invention, a pair of thin wall portions is formed in a substantially semicircular shape and provided symmetrically with respect to the thick wall portion.

According to a third aspect of the present invention, the vibration isolating device is adapted to be mounted on a vehicle, and the thick wall portion is arranged to extend in a forward and backward direction of the vehicle when being mounted on the vehicle.

According to a fourth aspect of the present invention, when spring constant in a principal vibration inputted direction is Z, and spring constant in dual directions meeting at right angles on a plane perpendicular to the principal vibration inputted direction is X and Y, a spring constant ratio of X or Y to Z is represented by X or Y:Z=1 or greater: 1.

According to a fifth aspect of the present invention, the vibration isolating device is a liquid sealed vibration isolating device, wherein an incompressible liquid is sealed in a space surrounded by the concave curved wall such that a portion of a liquid chamber is formed by the insulator.

According to a sixth aspect of the present invention, the liquid sealed vibration isolating device comprises the liquid chamber having a primary liquid chamber and a secondary liquid chamber which are divided by a partition member and communicated through an orifice passage, the partition member being provided with a hole opened to the primary liquid chamber, and the hole being closed on the side opposite to the primary liquid chamber by an elastic diaphragm member, wherein resonance by the hole, resonance by the elastic diaphragm member, first resonance and second resonance by the thin wall portion and resonance by the thick wall portion each occur according to changes in frequency of inputted vibrations in medium and high ranges of frequencies. Herein, the medium and high ranges of frequencies are a frequency range of 100~2000 Hz.

According to the invention as defined in the first aspect, the concave curved wall of the insulator is formed in a substantially circular shape when viewed in the principal vibration inputted direction, and the thick wall portion is formed substantially in the shape of a belt so as to extend at a substantially constant width across the circular region in the diametrical direction thereof. Therefore, the width of the outer peripheral portion and the width of the central portion of the thick wall portion are substantially constant thereby to make the difference in rigidity smaller in the longitudinal direction of the thick wall portion. Hence, when the thick wall portion is elastically deformed in the longitudinal direction against the vibration input in the lateral direction, the great stress concentration to the central portion side can be prevented, whereby the whole of the thick wall portion can be elastically deformed uniformly. Consequently, the durability of the insulator can be further improved without being influenced by the provision of the thin wall portion.

Moreover, since the rigid body covering portion for covering the surface of the metallic member of the vibration input portion is provided in the central area of the thick wall portion, and the thickness of the rigid body covering portion is 1.7 mm or greater, the free length of deformation in the longitudinal direction of the thick wall portion is not divided by the metallic member, and the rigid body covering portion moves easily without being bound by the vibration input portion. Accordingly, since the free length of the elastic deformation of the thick wall portion is expanded to be long, the stress concentration is lessened and the durability in the vicinity of the metallic member is greatly improved.

According to the invention as defined in the second aspect, since the thin wall portions of a substantially semicircular shape are provided symmetrically with respect to the thick wall portion, it is possible to make the thin wall portions large, and the spring constant ratios in the longitudinal direction of the thick wall portion and in the direction meeting at right angles therewith can be varied clearly.

According to the invention as defined in the third aspect, the vibration isolating device is to be mounted on the vehicle, and the thick wall portion is arranged to extend in the forward and backward direction of the vehicle when being mounted on the vehicle, thereby to make it possible to increase the spring constant in the forward and backward direction.

According to the invention as defined in the fourth aspect, since the spring constant ratio between each of the spring constant X and the spring constant Y in the dual directions meeting at right angles on the horizontal plane and the spring constant Z in the vertical direction is 1 or greater: 1, the spring constant ratio of the spring constant X and the spring constant Y to the spring constant Z can be improved greatly compared with each ratio which was formerly 0.8 and 0.4 at most in the 1.5 mm thickness of the rigid body covering portion.

According to the invention as defined in the fifth aspect, the incompressible liquid is sealed in the space surrounded by the concave curved wall so as to form the liquid sealed vibration isolating device, thereby making it possible to increase the durability of the liquid sealed vibration isolating device having the insulator with the thin wall portion.

According to the invention as defined in the sixth aspect, the liquid sealed vibration isolating device comprises the primary liquid chamber and the secondary liquid chamber which are divided by the partition member and communicated through the orifice passage, the partition member being provided with the hole opened to the primary liquid chamber, and the hole being closed on the side opposite to the primary liquid chamber by the elastic diaphragm member. The resonance by the hole, the resonance by the elastic diaphragm, the first resonance and the second resonance by the thin wall portion and the resonance by the thick wall portion each are generated according to the changes in the frequency of inputted vibrations in the medium and high ranges of frequencies. Herein, the medium and high ranges of frequencies are a frequency range of 100~2000 Hz. Therefore, it is possible to improve the dynamic characteristics in a wide range of frequencies by the sequential occurrence of these resonances.

DETAILED DESCRIPTION OF THE PREFERRED EMBODIMENT

Figure 1:
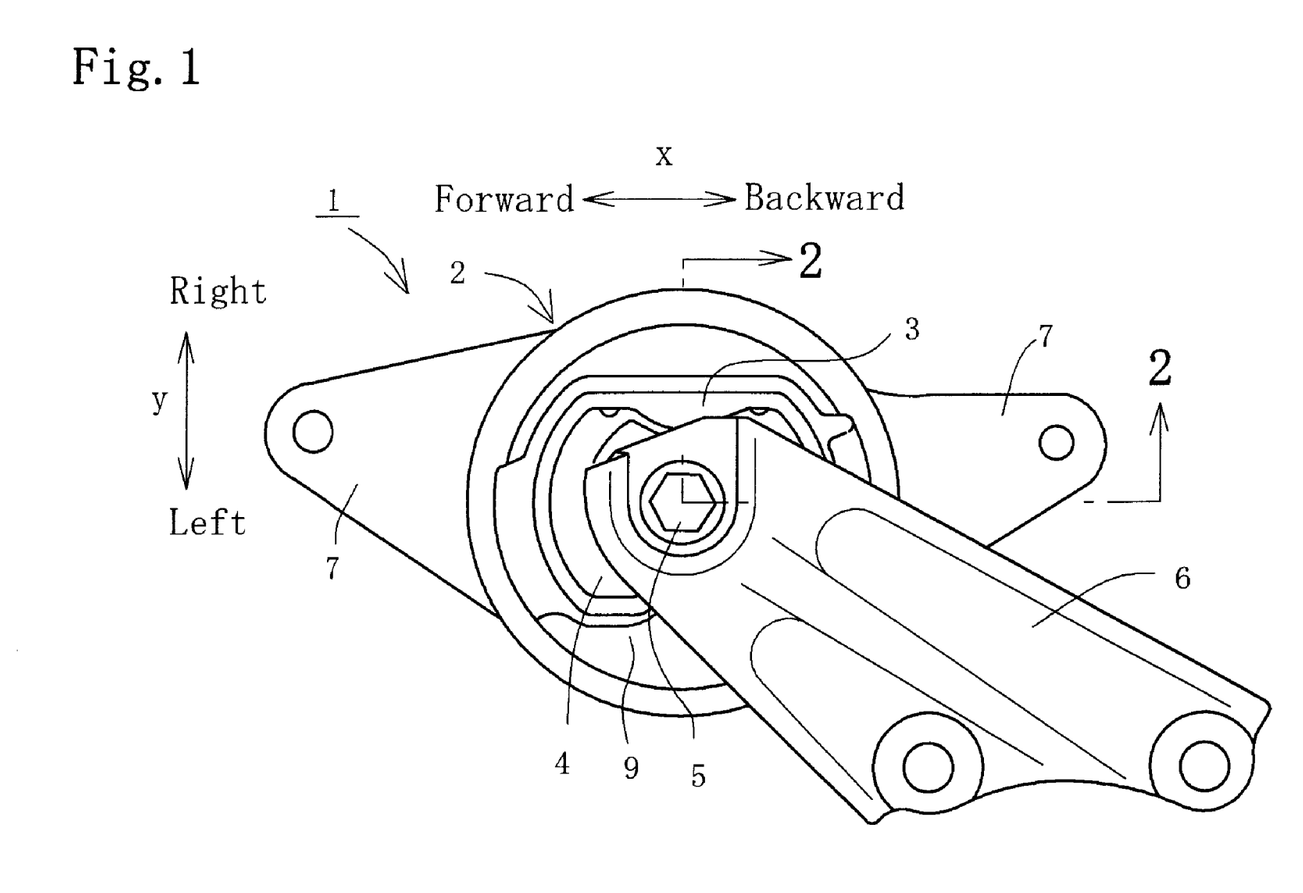
FIG. 1 is a plan view of a liquid sealed vibration isolating device according to an embodiment of the present invention.

Hereinafter, an embodiment embodied in an engine mount for motor vehicles will be explained with reference to the accompanying drawings, wherein FIG. 1 is a plan view of an engine mount 1. An insulator 3 is integrally provided on an upper part of a circular main body 2. A vibration input portion 4 of a block-shaped metallic member is implanted in the central area of the insulator 3 so as to be united therewith. On the tip of the vibration input portion 4 there is mounted one end of an engine bracket 6 through a bolt 5. The vibration input portion 4 is made of a rigid body such as proper metal or the like. The other end of the engine bracket 6 is mounted on an engine (not shown). The reference character 7 denotes a metallic fitting integrally welded with a lower portion of the main body 2, which is bolted to a vehicle body.

Figure 2:
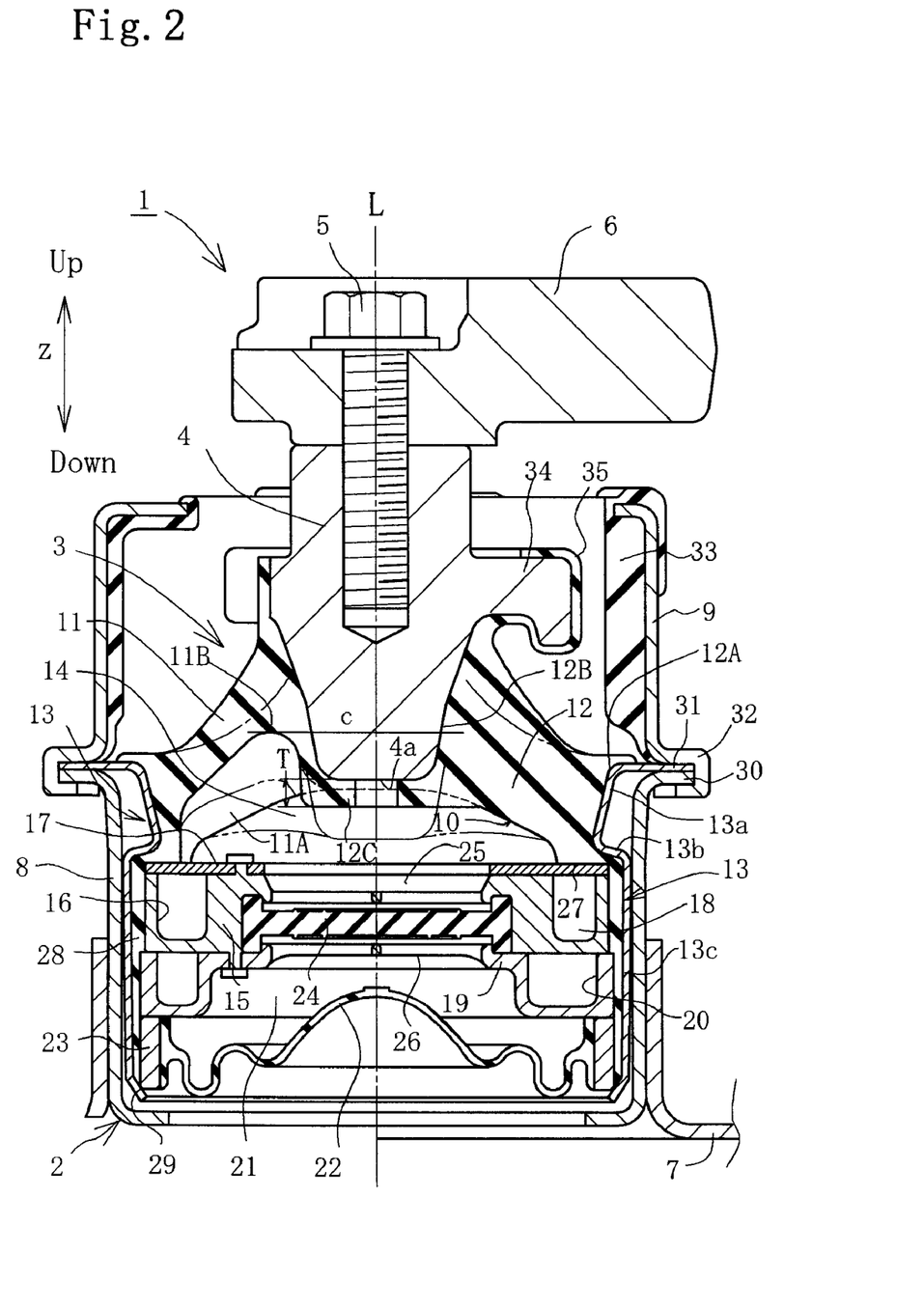
FIG. 2 is a cross sectional view taken along line 2-2 of FIG. 1.

FIG. 2 is a cross sectional view taken on line 2-2 of FIG. 1 and is sectioned along a center line L passing central axes of the vibration input portion 4 and the bolt 5. In this drawing, the direction along the center line L corresponds to a vertical direction, and, in the illustrated state that the center line L extends in the vertical direction, an upper side of the drawing, i.e., the side of the vibration input portion 4 corresponding to a principal vibration inputted side denotes an upper side while an opposite side, i.e., the side on which the lower portion of the main body 2 is located denotes a lower side. Also, the direction toward the lower side along the center line L denotes a principal vibration inputted direction Z while the direction meeting at right angles with the direction Z denotes a horizontal direction. Further, with respect to dual directions meeting at right angles in the horizontal direction, the direction extending parallel to a forward and backward direction of the vehicle body in use denotes a forward and backward direction X while the direction extending parallel to a right and left direction of the vehicle body denotes a right and left direction Y (see FIG. 1 and FIG. 3).

The main body 2 has an outer metallic cylinder member 8 of cylindrical shape and a stopper 9 comprised of a complex by metal and rubber to be mounted on an upper side of the outer metallic cylinder member 8. The stopper 9 surrounds the periphery of the insulator 3. The lower end of the insulator 3 is fitted to the upper inside of the outer metallic cylinder member 8.

The insulator 3 is made of known vibration isolating rubber material having a proper material property and is formed in a hollow substantially conical shape or a substantially dome shape as a whole. In a cross sectional view, the inner wall of the insulator 3 is formed into a concave curved wall portion 10 of substantially semispherical concave surface. In the insulator 3, thin wall portions 11 which are formed by providing recessed portions open to the concave curved wall portion 10 are provided at proper intervals in the circumferential direction, while a thick wall portion 12 is formed relatively by a portion other than the thin wall portions 11.

An inner metallic cylinder member 13 is fitted to the inside of the outer metallic cylinder member 8, and a small diameter portion 13a of a substantially U-shape in cross section provided on the upper part of the inner metallic cylinder member 13 is implanted in the outer peripheral portion of the insulator 3 to be united therewith. The inner metallic cylinder member 13 is in a substantially cylindrical shape as a whole and is formed of a metal plate thinner than the outer metallic cylinder member 8. A portion of the inner metallic cylinder member 13 to be implanted in the outer peripheral portion of the insulator 3 is formed to be the small diameter portion 13a, and through a step portion 13b located on the lower side thereof, an enlarged diameter portion 13c extends downwardly to be fitted to an inner peripheral wall of the outer metallic cylinder member 8.

The concave curved wall potion 10 of a dome shape of the insulator 3 forms a portion of a primary liquid chamber 14. A bottom of the primary liquid chamber 14 is closed by a first partition member 15. The first partition member 15 is in a circular disc shape and is provided on an outer peripheral portion thereof with an orifice groove 16 which is opened upwardly. The orifice groove 16 is covered with a lid 17 so as to form an orifice passage 18. The orifice passage 18 is in communication with the primary liquid chamber 14 through an opening (not shown in the drawing) provided in the lid 17 while it is in communication with an orifice groove 20 of a second partition member 19 through an opening (also not shown in the drawing) provided in the bottom of the orifice groove 16.

The second partition member 19 is formed in a circular disc shape with the orifice groove 20 opened upwardly on an outer peripheral portion thereof and is covered with the first partition member 15 placed on the upper wall thereof. In a bottom of the orifice groove 20 there is provided an opening (not shown in the drawing) through which the orifice groove 20 is in communication with a secondary liquid chamber 21 located under the second partition member 19. A lower part of the secondary liquid chamber 21 is covered with a diaphragm 22 so as to make a volume of the secondary liquid chamber 21 variable. An outer peripheral portion of the diaphragm 22 is formed integral with a metallic ring 23 thereby to be pressfitted into an inside of the enlarged diameter portion 13c of the inner metallic cylinder member 13.

The primary liquid chamber 14, the secondary liquid chamber 21, the orifice passages 18 and 20 are filled with an incompressible liquid hermetically. The orifice passages 18 and 20 communicate between the primary liquid chamber 14 and the secondary liquid chamber 21. When the liquid flows through the orifice passages 18 and 20 between the primary liquid chamber 14 and the secondary liquid chamber 21 by the vibrations inputted through the vibration input portion 4 to the primary liquid chamber 14, the liquid column resonance is generated to absorb energy of the inputted vibration, whereby the transmission of vibration is isolated. In this embodiment, the liquid column resonance is set to occur at a comparatively low range of frequencies (for example, about 20 Hz or less) when in an idling operation or the like.

An elastic diaphragm member 24 for separating the primary liquid chamber 14 and the secondary liquid chamber 21 is arranged between the first partition member 15 and the second partition member 19, with a peripheral portion thereof fixedly held. The elastic diaphragm member 24 faces the primary liquid chamber 14 through a first hole 25 of circular opening formed in a central area of the first partition member 15 and similarly, faces the secondary liquid chamber 21 through a second hole 26 of circular opening formed in a central area of the second partition member 19 in such a manner that when the liquid pressure of the primary liquid chamber 14 is increased by the inputted vibrations, it is elastically deformed to cancel the increase of the liquid pressure.

Also, the elastic diaphragm member 24 resonates with the specific inputted vibration frequency in the medium and high ranges of frequencies of 100~2000 Hz by being elastically deformed according to the liquid flow caused within the primary liquid chamber 14 by the inputted vibrations. This resonance is a diaphragm resonance by the resonant vibration of the elastic diaphragm member 24, and the resonant frequency at this time can be comparatively freely set by adjusting the spring elasticity of the elastic diaphragm member 24.

Further, when the liquid in the primary liquid chamber 14 flows through the first hole 25, this liquid flow has the liquid column resonance (hereinafter, referred to as hole resonance) generated at the specific frequency in the medium and high ranges of frequencies. Since the resonance frequency in this hole resonance has something to do with the volume of liquid flow space above the elastic diaphragm member 24 and within the first hole 25, it can be comparatively freely set by adjustment of a passage opening area or the like.

Further, since the thin wall portion 11 and the thick wall portion 12 of the insulator 3 function as a kind of elastic diaphragm member, each of them generates the diaphragm resonance at the specific frequency by the inputted vibrations in the medium and high ranges of frequencies. Each of the resonance frequencies can be comparatively freely set by adjustment of the spring elasticity by adjusting the thickness of each of the thin wall portion 11 and the thick wall portion 12. The dynamic characteristics with respect to these resonance points will be explained later.

A portion of the peripheral portion of the insulator 3 in the vicinity of the small diameter portion 13a is provided with a step 27 which protrudes toward the enlarged diameter portion 13c. A comparatively thin liner portion 28 formed continuously integral with the insulator 3 is also provided inside of the enlarged diameter portion 13c.

When assembling this engine mount 1, firstly a sub-assembled body that the vibration input potion 4 and the inner metallic cylinder member 13 are united together though the insulator 3 is made. Turning this sub-assembled body upside down from the illustrated state in the drawing, the lid 17, the first partition member 15, the second partition member 19 and the diaphragm 22 are inserted in order into the cylindrical space formed by the enlarged diameter portion 13c and the liner portion 28. Then, a lower end of the enlarged diameter portion 13c is bent inwardly to form a bent portion 29, thereby to be assembled together into an intermediate assembled body.

At this time, the bent portion 29 is fixedly connected in contact between metallic members with the metallic ring 23 integrally formed with the outer peripheral portion of the diaphragm 22. Then, the lid 17 and the orifice groove 16 are positioned in place by the step 27 and sealed in close contact with the step portion 27.

In this way, the insulator 3, the vibration input portion 4, the inner metallic cylinder member 13, the first partition member 15, the lid 17, the second partition member 19 and the diaphragm 22 are assembled together into the intermediate assembled body. Further, the inner metallic cylinder member 13 is fitted into the outer metallic cylinder member 8 and united with the stopper 9, so that the whole is assembled together. At this time, since an outward flange 30 is formed in the upper end of the outer metallic cylinder member 8, on the flange 30 there are placed an outward flange 31 provided in the upper end of the inner metallic cylinder member 13 and a lower end 32 of the stopper 9 in order. Then, the lower end 32 is bent into a substantially U-shape in cross section around each of the flanges 30 and 31 and the roll-caulking is performed, so that each of component members is united together.

While the outside of the stopper 9 is formed by metal, on the inside thereof a liner rubber 33 is integrally provided, so as to receive, while buffering, the movement of a projection 34 projecting laterally from an outer periphery of the vibration input portion 4. On the surface of the projection 34 there is also provided a cover portion 35 which is formed continuously integral with the insulator 3.

Figure 3:
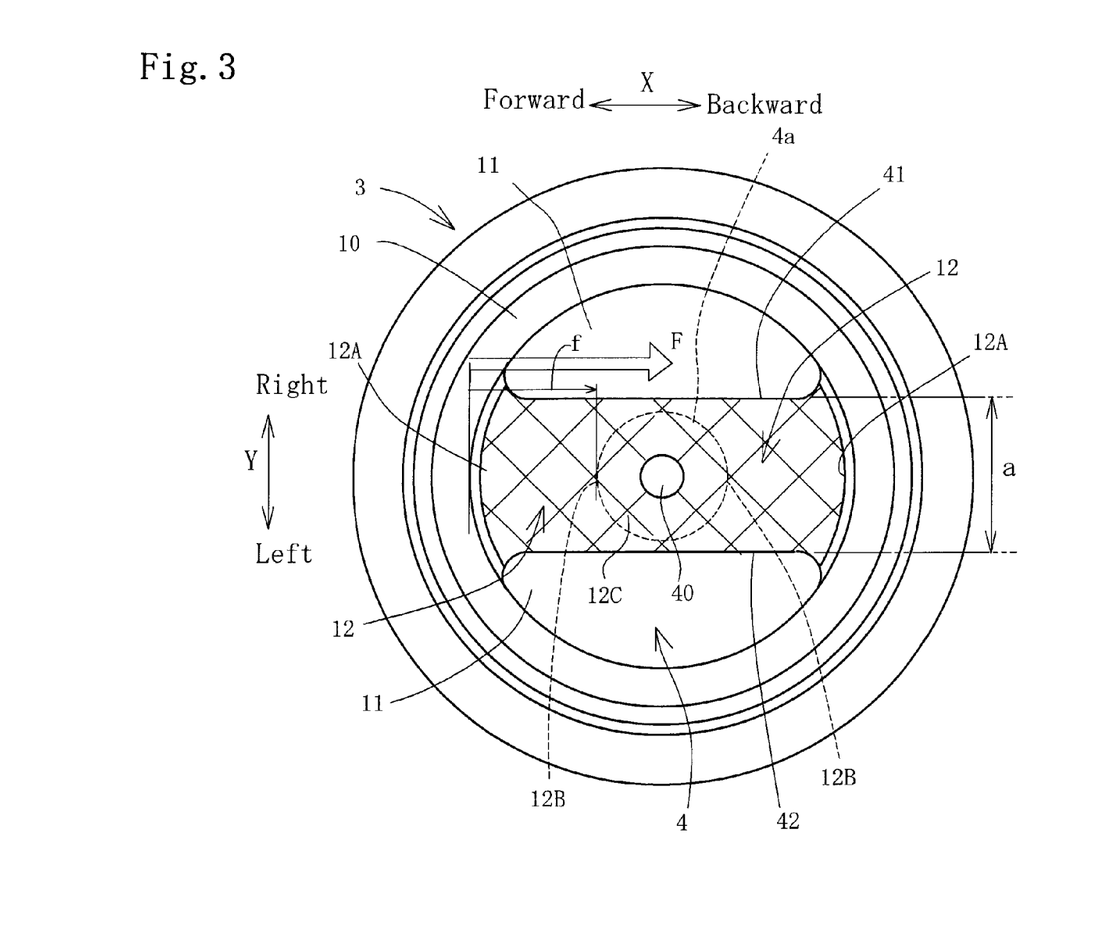
FIG. 3 is a view of an insulator shown in a principal vibration inputted direction.

FIG. 3 is a view of the concave curved wall portion 10 of the insulator 3 viewed from the lower side of FIG. 2, in which the concave curved wall portion 10 is formed substantially in a circular shape. The thick wall portion 12 (shown in cross striped hatching) is formed substantially in a belt shape to extend across the concave curved wall portion 10 in the diametrical direction while passing the vibration input portion 4 and is arranged to have the longitudinal axis thereof directed in the forward and backward direction. Portions of the forward and backward ends being connected with the inner metallic cylinder member 13 (see FIG. 2) are formed as an outer peripheral restrained portion 12A while a portion of the center region being connected with the vibration input portion 4 is formed as a central restrained portion 12B. The thick wall portion 12 has a substantially constant width "a" along its entire length including a rigid body covering portion 12C in the vicinity of the vibration input portion 4. The right and the left thin wall portions 11 of a substantially semicircular shape are symmetrically arranged on the right and left sides of the thick wall portion 12.

The thick wall portion 12 is a portion for increasing the rigidity of the insulator 3 and is long in the forward and backward direction while being narrow in the right and left direction. Therefore, since in a cross section in the forward and backward direction the insulator 3 becomes large in volume due to the thick wall portion 12, the spring constant in this direction is increased. On the other hand, since in the right and left direction of the insulator 3 the thin wall portions 11 are located on both sides of the thick wall portion 12 of narrow width, and in a cross section in this direction the insulator 3 becomes small in volume due to a lot of recessed portions, the spring constant in this direction is decreased. Incidentally, the expression with respect to the spring constant of the insulator 3 in each of these directions is identical to the expression of the directions X, Y and Z as above.

The thin wall portions 11 are portions for decreasing the spring constant X in vertical direction, the spring constant Y and the spring constant Z in the horizontal direction of the insulator 3. On the other hand, since the thick wall portion 12 is greater in thickness than the thin wall portions 11, the rigidity becomes relatively higher so as to increase the spring constant X in the forward and backward direction. Namely, the spring constant X, the spring constant Y and the spring constant Z in the three directions meeting at right angles are different in magnitude, respectively.

In this embodiment, the spring constant ratio of X:Y:Z is approximately 1:1.5:1. In this case, when the spring constant Z is 1, the ratios of the spring constant X and the spring constant Y to the spring constant Z are 1 or greater, respectively, and these spring constant ratios can be optionally set according to the conditions of use or the like. In particular, when it is required to increase the spring constant in the forward and backward direction, it is preferable that the spring constant X is 1.5 or greater, and for example, it is possible to set X:Y:Z=1:1.7:1. The upper limits of X and Y are not set, but there is a given limit as a matter of course. Also, the magnitude of the spring constant X, the spring constant Y and the spring constant Z in each of the directions can be freely set by adjusting the thickness and the width of the thick wall portion 12 and the thin wall portion 11 or the like, whereby the ratios of the spring constant X, the spring constant Y and the spring constant Z can be freely adjusted.

The thick wall portion 12 is in a belt shape extending forwardly and backwardly while covering the vibration input portion 4 and, in the center area of the thick wall portion 12, is continuously formed forwardly and backwardly through the rigid body covering portion 12C which is increased in thickness, while passing the vibration input portion 4. Therefore, the elastic deformation of the thick wall portion 12 is not divided by the vibration input portion 4 but is performed in one integral body in front of and behind the vibration input portion 4 through the rigid body covering portion 12C. Consequently, the elastic deformation of the thick wall portion 12 on the forward side of the vibration input portion 4 extends across the central restrained portion 12B to the thick wall portion 12 on the backward side thereof, for example.

In the conventional example which has no thick wall structure like the rigid body covering portion 12C in the present invention, since the deformation of the thick wall portion 12 is divided by the vibration input portion 4, the free length "f" of the elastic deformation with respect to the thick wall portion of the insulator 3 can not extend beyond the central restrained portion 12B. However, in the present invention, it is possible to form the free length F which extends long beyond the central restrained portion 12B.

By the way, the reference character 40 denotes a positioning bore at the time of molding, formed in the center of the rigid body covering portion 12C, and a portion of the vibration input portion 4 is exposed there. However, this bore 40 is small so as not to damage the integration between the forward portion and the backward portion of the thick wall portion 12 across the vibration input portion 4. Moreover, since the width in the right and left direction of the center portion of the thick wall portion 12 is greater than the width of the vibration input portion 4, the forward and the backward portions of the thick wall portion 12 are formed continuously and integrally in the right and left direction of the vibration input portion 4 so as to help the integral elastic deformation between the forward and the backward portions. Lateral edges 41 and 42 of the thick wall portion 12 are formed straight when the thin wall portions 11 are formed by a metallic mold.

Figure 4:
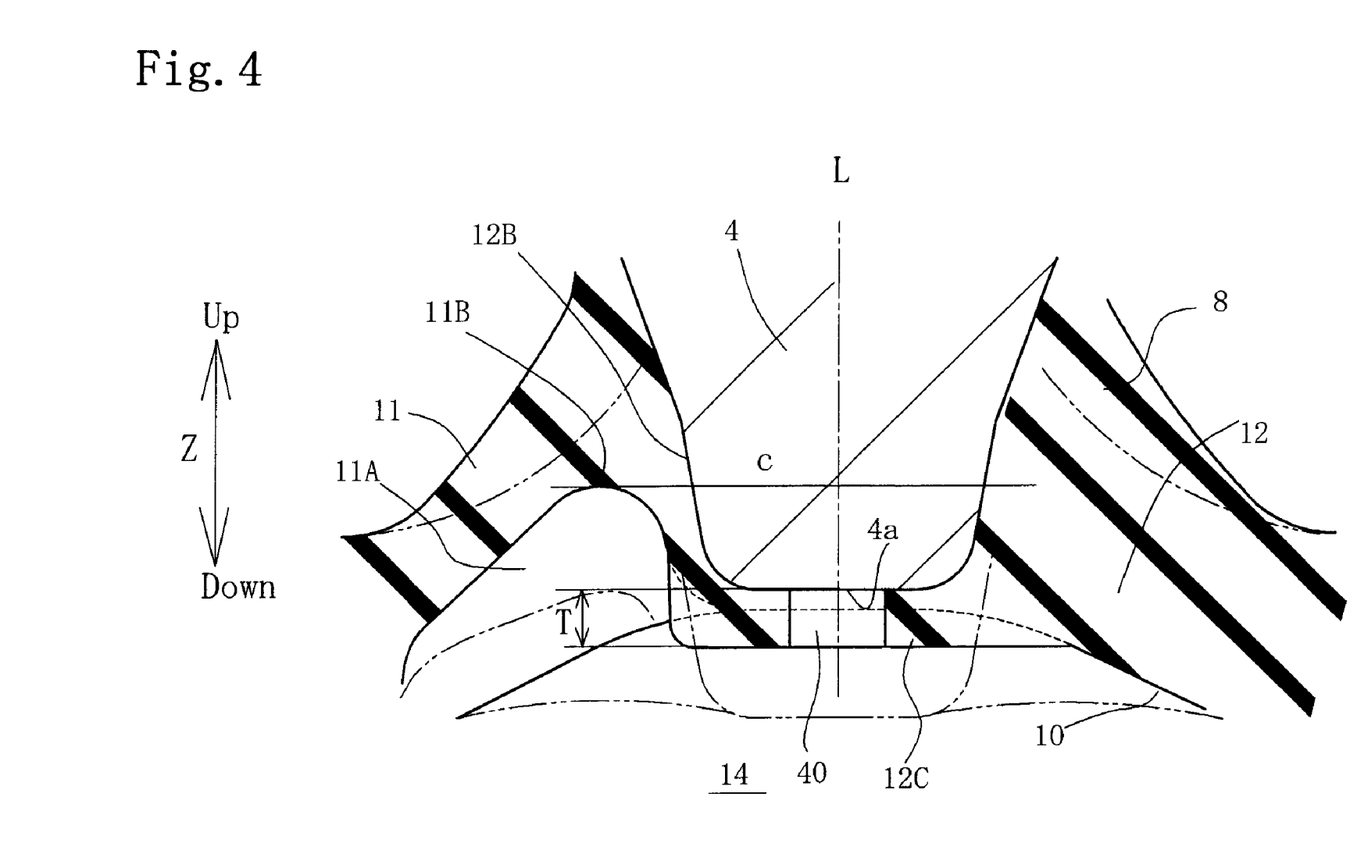
FIG. 4 is a partly enlarged view of FIG. 2.

FIG. 4 is an enlarged view of a portion of the insulator 3 in the vicinity of the vibration input portion 4, wherein a bottom wall 4a of the metallic member corresponding to the lower end of the vibration input portion 4 is covered with the rigid body covering portion 12C corresponding to the center portion of the thick wall portion 12. The rigid body covering portion 12C is greater in thickness in comparison with the conventional one and the thickness T is about 3~5 mm. However, since the thickness T is important for forming the greater free length, the lower limit is to be set at 1.7 mm or greater, preferably at 2 mm or greater, and still preferably at 3 mm or greater. As will be explained hereunder, when the thickness of the rigid body covering portion 12C is about 1.7 mm, the continuous elastic deformation with respect to the forward portion and the backward portion of the thick wall portion 12 is developed so as to make a marked contribution to the increase of the free length, while when it becomes less than 1.7 mm, the forward portion and the backward portion are divided so as to hardly contribute to the increase of the free length. Further, since the ratio of the increase in the free length to the change in thickness becomes gradually small at about 3 mm, about 2~5 mm around 3 mm are effective.

The upper limit of the thickness T substantially corresponds to a dimension between a horizontal line "c" passing the most recessed, highest portion 11B of a recess 11A formed on the inner wall of the thin wall portion 11 and the bottom surface of the rigid body covering portion 12C. When the upper surface of the rigid body covering portion 12C passes the horizontal line "c" upwardly, the portion surrounding the vibration input portion 4 does not function as the restrained portion 12B, so that the spring characteristics of the insulator 3 becomes unstable. In this embodiment, the upper limit is about 7 mm.

Figure 5:
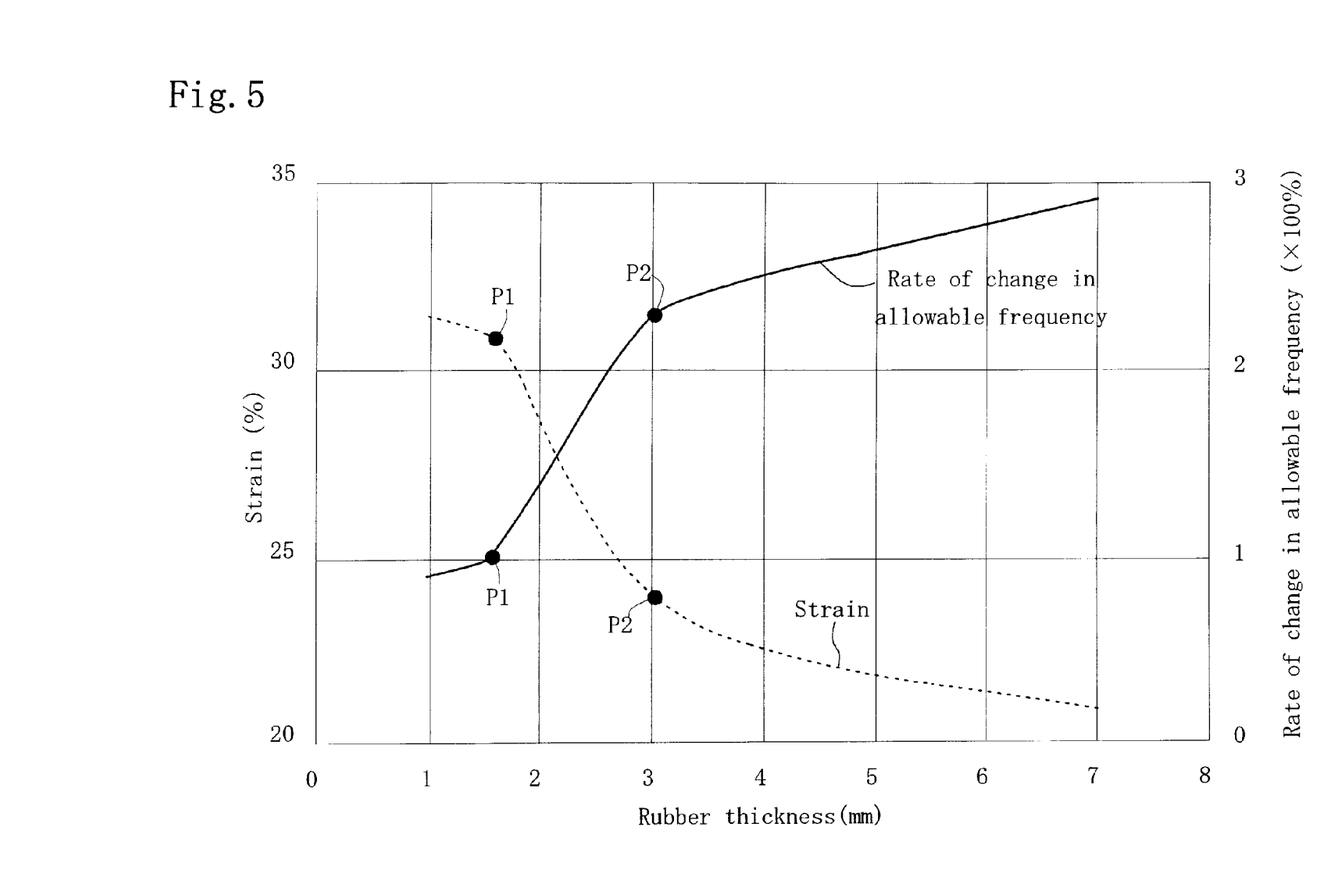
FIG. 5 is a graph showing the relationship between a thickness, a strain and a rate of change in allowable frequency.

FIG. 5 is a graph showing the relationship between the strain (%) against the changes in thickness of the thick wall portion 12 and the rate (%) of change in allowable frequency. There are shown the results obtained through the endurance tests until the disadvantage such as a crack or the like appears in the restrained portion 12B when having the engine mount 1 excited by repeated vibrations with respect to every thickness. The strain denotes the rate of deformation after the test respect to the value before the test. The allowable frequency denotes the vibration exciting frequency (an order of a million times) up to the appearance of the disadvantage such as a crack or the like. The rate of change in allowable frequency denotes the rate of increase and decrease to the base value in allowable frequency.

For example, when the thickness is 1.5 mm, the strain is 31%. Then, if based on the allowable frequency, the rate of change in allowable frequency is 1. When the thickness is 3 mm, the strain is decreased about 20%, and the rate of change in allowable frequency is improved 200% or greater. Further, when the thickness is 5 mm, the strain becomes 22% that is decreased about 30% in comparison with 1.5 mm in thickness, and the rate of change in allowable frequency becomes a little less than 270%. Namely, it is understood that the decrease in the strain develops the remarkable change in the improvement of durability.

As apparent from this graph, the curve of the strain slanting downward to the right and the curve of the rate of change in allowable frequency slanting upward to the right with respect to the thickness of the horizontal axis reach a first inflection point P1 at about 1.7 mm in thickness, then cross at about 2 mm in thickness, and thereafter reach a second inflection point P2 at about 3 mm in thickness, respectively. Between the first inflection point P1 and the second inflection point P2, there is a sharp rise in the rate of change in allowable frequency with respect to the change in thickness, while there is a sharp drop in the strain to cause the relaxation of the strain that means the increase in the endurance frequency. In this range, the rigid body covering portion 12C is released from the restraint by the vibration input portion so as to be in a freely movable state.

When the thickness is smaller than 1.7 mm, the rate of change in allowable frequency and the strain do not reach the first inflection point P1 and change slowly relative to the change in thickness. In this state, the rigid body covering portion 12C is in a freely immovable state as it is restrained by the vibration input portion 4. Further, when the thickness becomes greater than about 3 mm, the rate of change in allowable frequency and the strain change gradually slowly, beyond the second inflection point P2, relative to the change in thickness. Accordingly, although there is a contribution to the improvement of durability, since the free movement of the rigid body covering portion 12C has already been ensured sufficiently, the rate of an effect relative to the change in thickness is gradually decreased.

Figure 6:
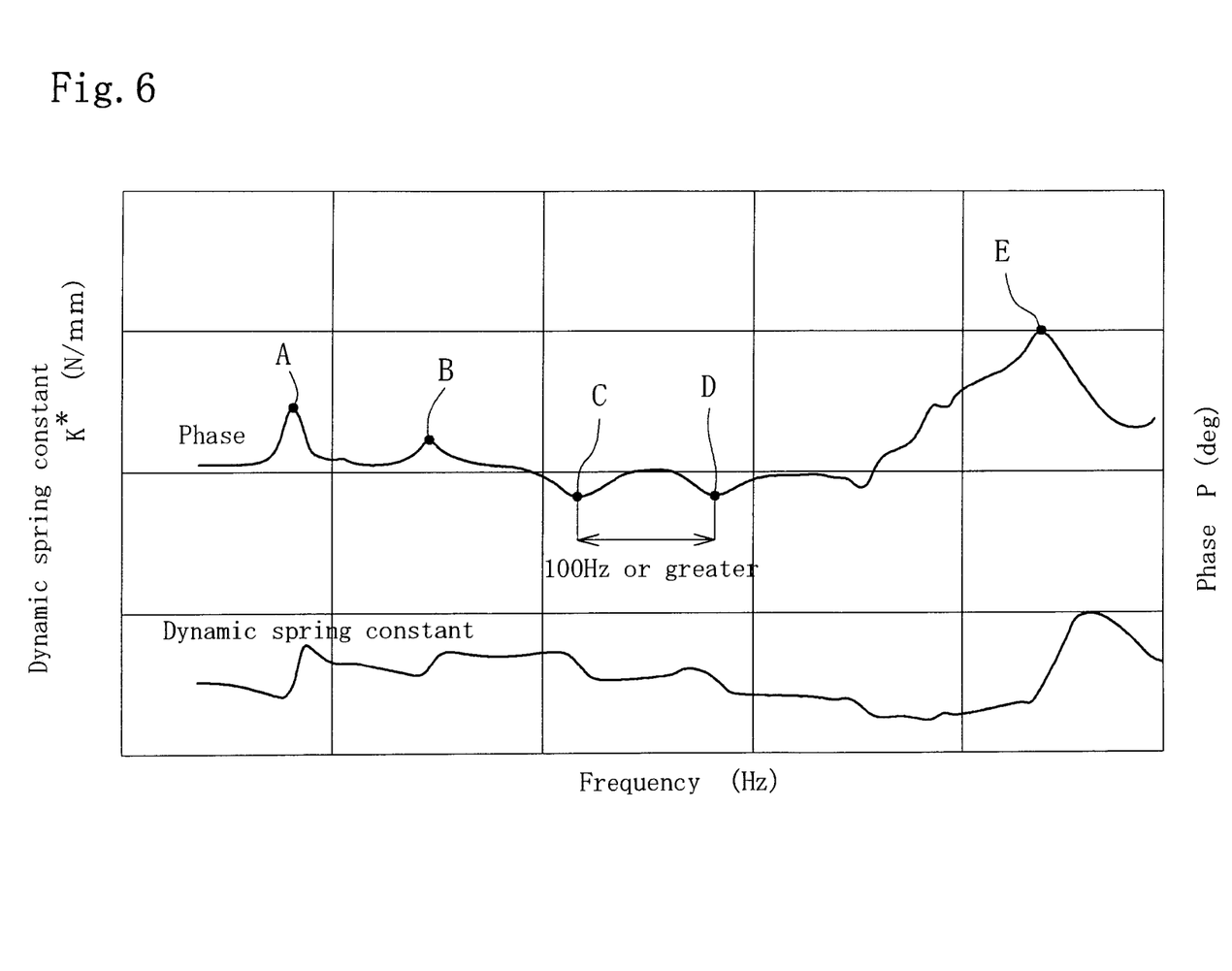
FIG. 6 is a graph showing dynamic characteristics of the embodiment.

FIG. 6 is a graph showing dynamic characteristics of the engine mount 1 in order for indicating settings of each of resonance points of the engine mount 1, wherein the horizontal axis shows a frequency (Hz) and the vertical axis shows a dynamic spring constant K*(N/mm) and a phase P (degree). Also, this graph shows a range of about 100~1000 Hz of the frequencies of the inputted vibration in the medium and high frequency ranges. Therefore, there is not shown the liquid column resonance by the orifice passage 18, which occurs in a low frequency range.

In this drawing, as apparent from the phase curve on the upper side, the resonances A~E occur in order as the frequency increases in the medium and high frequency ranges. The reference character A denotes the hole resonance generated by the first hole 25, the reference character B denotes the first resonance by the thin wall portion 11, the reference character C denotes the diaphragm resonance generated by the elastic diaphragm member 24, the reference character D denotes the second resonance by the thin wall portion 11, and the reference character E denotes the diaphragm resonance by the thick wall portion 12.

Incidentally, in the case where the resonance points coexist a lot like this, a certain resonance point is influenced by other resonance point. Therefore, each of the resonance points is the one (hereinafter, referred to as compound) that is formed by being compounded with other resonance. This compound serves to have the neighboring resonance points leveled when these points are located properly remote from each other, while these points may be amplified when coming excessively close to each other. Therefore, in this embodiment, they keep a distance of 100 Hz or greater from each other. In particular, while the diaphragm resonance (C) by the elastic diaphragm member 24 and the second diaphragm resonance (D) are generated in neighboring positions and in the closest state due to the settings of the spring elasticity, there is provided a distance of 100 Hz or greater between C and D.

On the lower side of the drawing there are shown the dynamic spring characteristics, wherein compounded results of the resonance points A~E are shown. As apparent from the characteristics, the medium and high frequency ranges are leveled in a comparatively low dynamic spring state by having each of the resonance points generated in order as above thereby making it possible to obtain suitable dynamic characteristics. Then, this leveling is ensured by keeping the distance of 100 Hz or greater between the neighboring resonance points.

Also, the order of occurrence of the resonances is important for the leveling as above. By interposing the diaphragm resonance C by the elastic diaphragm member 24 between the diaphragm resonances B and D by the thin wall portion 11, each of the diaphragm resonances B~E occurs at a suitable distance, so that the adjustment for realizing the leveling of all the resonances can be easily performed. Therefore, if this order is changed, there may be caused such a problem that the spring adjustment between the diaphragm resonance generating portions becomes difficult.

Further, with respect to the spring adjustment of this diaphragm resonance, the spring constant setting of the elastic diaphragm member 24 is also important. When the elastic diaphragm member 24 is hardened too much to increase the spring constant, the distance to the second diaphragm resonance D by the thin wall portion 11 is narrowed so that the amplified compound is developed. Hence, the spring constant setting of the elastic diaphragm member 24 needs to be properly performed considering a balance with both neighboring resonance points B and D.

Next, the operation of this embodiment will be explained. In FIG. 2, when the engine mount 1 is installed in the vehicle body, the vibration input portion 4 is pressed and moved downward by the initial load from the engine, so that the elastically deformed section of the insulator 3 located between the upper portion of the inner metallic cylinder member 13 and the vibration input portion 4 is initially deformed from the upwardly slanted cross section to the substantially horizontal configuration as shown in phantom line.

In this state, when there is the vibration input to the vibration input portion 4 in the vertical direction, the elastic deformation mainly comprised of the shear is caused in the elastically deformed section of the insulator 3 while the elastic deformation mainly comprised of the compression and tension is caused in the horizontal direction. Also, the existence of the thin wall portion 11 makes the spring constant Z in the vertical direction smaller. Consequently, the spring constant ratios of X and Y to Z become considerably greater. Namely, this engine mount 1 is configured in such a state that the spring constant in the horizontal direction is greater than that in the vertical direction.

In FIG. 3, the vibration input in the forward and backward direction among the vibration input in the horizontal direction is controlled by the elastic deformation of the thick wall portion 12 mainly comprised of the compression and tension in the longitudinal direction thereof, while the vibration input in the right and left direction is controlled by the elastic deformation by the bending mainly of the thick wall portion 12 in the direction meeting at right angles with the longitudinal direction. Further, in the right and left direction, the value of the spring constant Y becomes smaller than the spring constant X by the existence of the thin wall portions 11, 11. Accordingly, the spring constant in each of the directions is set such that there causes a tendency to be X>Y>Z.

Namely, the thick wall portion 12 develops the elastic deformation mainly comprised of the tension and compression between the outer peripheral portion 12A and the central restrained portion 12B with respect to the vibration input in the forward and backward direction. Then, since the thick wall portion 12 is greater in thickness and the force is applied to both ends in the longitudinal direction, the spring constant X in the forward and backward direction becomes greatest and has the spring constant ratio of 1.5 or greater in comparison with the spring constant Z in the vertical direction. However, even in the insulator of which the spring constant in the horizontal direction is greater like this, it is preferable that the spring constant ratio of X to Z is the order of 1.0~1.7 in view of the total balance.

While the vibration input in the right and left direction is controlled by the elastic deformation of the thick wall portion 12 and the thin wall portions 11, the bending of the thick wall portion 12 acts mainly since the spring constant of the thin wall portion 11 is small. Therefore, the spring constant Y in the right and left direction is a little smaller than the spring constant in the forward and backward direction, and the spring constant ratio of Y to Z is adjusted to be 1.0 or greater and to be smaller than the spring constant ratio of X to Z.

Further, since the thick wall portion 12 is in a substantially belt shape, the widths "a" of the outer restrained portion 12A and the central restrained portion 12B are identical, and the width of the intermediate portion is substantially constant, there is not caused the difference in rigidity in the longitudinal direction too much. Hence, the elastic deformation with respect to the input in the forward and backward direction is developed uniformly throughout the thick wall portion 12 and there is no concentration of stress on the specific region such as the central side, etc. The avoidance of the stress concentration with respect to the thick wall portion 12 is ensured similarly in the elastic deformation of the thick wall portion 12 in each of the vertical direction and the right and left direction.

In addition, since the rigid body covering portion 12C which covers the tip of vibration input portion 4 is provided at the central area of the thick wall portion 12, and the thickness of the rigid body covering portion 12C is set at 1.7 mm or greater, the rigid body covering portion 12C is freely movable without restraint of the vibration input portion 4 so as to increase the free length of the elastic deformation of the thick wall portion 12, whereby the strain in the central restrained portion 12B can be relaxed considerably. Accordingly, the durability of the thick wall portion 12 against the continuously repeated elastic deformation can be improved even in the structure that the thin wall portions 11 are provided.

Further, in the insulator 3 having the thin wall portion 11, since the spring constant X and the spring constant Y in the horizontal direction are able to be set greater than the spring constant Z in the vertical direction due to the improvement in durability of the thick wall portion 12 as above, the improvement of the spring ratio and the improvement in durability can be accomplished simultaneously. Also, the freedom of the spring constant setting of X, Y and Z in the three directions meeting at right angles can be increased.

Further, the thick wall portion 12 as above is suitably applicable to the structure like this embodiment that the insulator 3 becomes substantially horizontal by the downward movement of the vibration input portion 4 when the initial load is imposed thereon, and the elastic deformation in the horizontal direction is developed at a high spring value mainly by the compression and tension.

Also, since the thin wall portions 11 of a semicircular shape are symmetrically arranged across the thick wall portion 12, the thin wall portions 11 can be increased in size and the spring constant ratio between the spring constant X in the longitudinal direction of the thick wall portion 12 and the spring constant Y in the right and left direction meeting right angles therewith can be distinctly varied. In addition, when the thick wall portion 12 is arranged in the forward and backward direction of the vehicle at the time of being mounted on the vehicle, it is possible to easily make the spring constant X in the forward and backward direction greater.

Moreover, as shown in FIG. 6, since the hole resonance A by the first hole 25, the first diaphragm resonance B by the thin wall portions 11, the diaphragm resonance C by the elastic diaphragm member 24, the second diaphragm resonance D by the thin wall portion 11 and the diaphragm resonance E by the thick wall portion 12 are generated in this order in accordance with the increase in frequency of the inputted vibration in the medium and high frequency ranges, the extensive dynamic characteristics in the medium and high frequency ranges can be leveled so as to make it possible to improve the dynamic characteristics.

Then, by interposing the diaphragm resonance C by the elastic diaphragm member 24 between the diaphragm resonances B and D by the thin wall portions 11, it is possible to easily adjust each of the diaphragm resonances B~E to occur in proper distances so as to realize the total leveling. In addition, there are cases where the dynamic characteristics are able to be leveled by adjusting the resonance points of the hole resonance and each of the diaphragm resonances even if the order of occurrence of the plurality of resonances as above is changed. Accordingly, when these five kinds of resonances A~E occur at the predetermined frequency distances without sticking to the order of occurrence thereby leveling the whole dynamic characteristics, the dynamic characteristics in the medium and high frequency ranges can be improved extensively.

While the invention has been described in its preferred embodiment, it is to be understood that the present invention is not limited to the above described embodiment but modifications and applications may be variously made within the scope and sprit of the invention. For example, the spring constant ratio between X and Y is not necessarily X>Y. X=Y or X<Y can be freely set according to conditions of use. Further, such directional property of the spring can be set freely. Namely, the input direction of the principal vibration may be set in any of the vertical direction, the forward and backward direction and the right and left direction, and other two directions that meet at right angles can be properly determined according to the principal vibration input direction.

Moreover, when the thick wall portion 12 is formed in a cross shape so as to extend in the forward and backward direction and in the right and left direction, it is possible to increase the spring constant in the forward and backward direction and in the right and left direction. The width and thickness of the thick wall portion 12 can be freely adjusted. Also, the shape, number and thickness of the thin wall portion 11 can be freely selected, and it may be formed in a substantially elliptic shape, for example. Further, the present invention may be applied to various kinds of vibration isolating devices for the vehicle or others. In the case where the present invention is applied to the one for the vehicle, it can be used for various purposes other than the engine mount. The vibration isolating device of the present invention is not limited to the liquid sealed typed vibration isolating device but can be applied to the one using no liquid, for example, that the liquid is removed from the liquid sealed structure.

What is claimed is:
1. A vibration isolating device, comprising:
a cylindrical shaped main body integrated with a principal vibration input portion arranged inside the main body,
an insulator for isolating vibrations of said principal vibration input portion from said main body by an elastic deformation of said insulator,
a primary liquid chamber formed by said insulator and a second liquid chamber which is separated from said primary liquid chamber by a partition member, wherein said primary liquid chamber communicates with said second liquid chamber,
said principal vibration input portion being provided in a central area of a concave curved wall portion formed in said insulator,
a thin wall portion and a thick wall portion being formed by relatively varying a thickness of said insulator around the principal vibration input portion,
wherein said concave curved wall portion of said insulator is formed in a substantially circular shape when viewed in a principal vibration inputted direction, said thick wall portion is formed substantially in the shape of a belt of a predetermined width and extends across said concave curved wall portion in a diametrical direction thereof while passing said principal vibration input portion, wherein connecting portions of said thick wall portion are provided in opposed outer peripheral restrained portions of said insulator which are connected with a reduced diameter portion formed on an upper end portion of said cylindrical main body, a covering portion of said thick wall portion which covers a lower end portion of said principal vibration input portion is formed as a rigid body covering portion, the width of said thick wall portion, which is a length in a direction across a longitudinal direction of said insulator when viewed in the principal vibration inputted direction, is identical from a vicinity of one outer peripheral restrained portion to a vicinity of the other outer peripheral restrained portion including the rigid body covering portion in the vicinity of said principal vibration input portion and excluding the outer peripheral restrained portions, and
the rigid body covering portion for covering the lower end of said principal vibration input portion is provided in the central area of said thick wall portion, and wherein a thickness of said rigid body covering portion is 1.7 mm or greater.

2. The vibration isolating device according to claim 1, wherein the thin wall portions are formed in a substantially semicircular shape and provided symmetrically with respect to said thick wall portion.

3. The vibration isolating device according to claim 1, wherein the vibration isolating device is adapted to be mounted on a vehicle, and said thick wall portion is arranged to extend in a forward and backward direction of the vehicle when being mounted on the vehicle.

4. The vibration isolating device according to claim 1, wherein when a spring constant in the principal vibration inputted direction is Z, and a spring constant in dual directions meeting at right angles on a plane perpendicular to the principal vibration inputted direction is X and Y, a spring constant ratio of X or Y to Z is represented by Z:X or Y=1:1 or greater.

5. The vibration isolating device according to claim 1, wherein the vibration isolating device is a liquid sealed vibration isolating device, and an incompressible liquid is sealed in a space surrounded by said concave curved wall portion such that a portion of a liquid chamber is formed by said insulator.

6. The vibration isolating device according to claim 5, wherein the liquid sealed vibration isolating device comprises said liquid chamber having the primary liquid chamber and the secondary liquid chamber which are divided by the partition member and communicated through an orifice passage, said partition member being provided with a hole opened to said primary liquid chamber, and said hole being closed on the side opposite to said primary liquid chamber by an elastic diaphragm member, and wherein resonance by said hole, resonance by said elastic diaphragm member, first resonance and second resonance by said thin wall portion and resonance by said thick wall portion each occur according to changes in frequency of inputted vibrations in medium and high ranges of frequencies.

* * * * *